(12) United States Patent
Kim (10) Patent No.: US 11,420,483 B2
(45) Date of Patent: Aug. 23, 2022

(54) TIRE NOISE REDUCTION DEVICE

(71) Applicants: Hyundai Motor Company, Seoul (KR); Kia Motors Corporation, Seoul (KR)

(72) Inventor: Ju Ho Kim, Whasung-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 876 days.

(21) Appl. No.: 16/263,821

(22) Filed: Jan. 31, 2019

(65) Prior Publication Data

US 2020/0171889 A1 Jun. 4, 2020

(30) Foreign Application Priority Data

Dec. 3, 2018 (KR) .......................... 10-2018-0153853

(51) Int. Cl.
*B60C 19/00* (2006.01)
*B60B 21/12* (2006.01)
(52) U.S. Cl.
CPC ............ *B60C 19/002* (2013.01); *B60B 21/12* (2013.01); *B60B 2900/131* (2013.01); *B60B 2900/133* (2013.01)
(58) Field of Classification Search
CPC . B60C 19/002; B60B 21/12; B60B 2900/131; B60B 2900/133
See application file for complete search history.

(56) References Cited

U.S. PATENT DOCUMENTS

| 10,011,148 B2 | 7/2018 | Kamiyama |
| 2009/0072611 A1* | 3/2009 | Kashiwai ............ B60C 23/0494 |
| | | 301/5.21 |
| 2009/0108666 A1 | 4/2009 | Kashiwai et al. |
| 2013/0240290 A1 | 9/2013 | Layfield et al. |

(Continued)

FOREIGN PATENT DOCUMENTS

| CN | 104070925 A | 10/2014 |
| CN | 104832328 A | 8/2015 |
| CN | 108826647 A | 11/2018 |

(Continued)

OTHER PUBLICATIONS

European Search Report dated Jun. 25, 2019 for European Patent Application No. 19156816.1.

*Primary Examiner* — Scott A Browne
(74) *Attorney, Agent, or Firm* — Morgan, Lewis & Bockius LLP (57) ABSTRACT

A tire noise reduction apparatus may include a housing mounted on an external circumferential surface of a wheel rim on which a tire is mounted, the housing having an internal space and being open at one side in a circumferential direction of the wheel rim, wherein the housing includes a neck at an opposite side which is opposite to the open one side; and a movable member inserted into the internal space of the housing through the open one side of the housing and having an internal space in fluidical communication with the internal space of the housing, the movable member being mounted to the housing to be movable in a direction in which the movable member is inserted into the internal space of the housing and in a direction in which the movable member is withdrawn out of the housing.

10 Claims, 6 Drawing Sheets

(56) References Cited

U.S. PATENT DOCUMENTS

2017/0297384 A1 10/2017 Lee

FOREIGN PATENT DOCUMENTS

| | | |
|---|---|---|
| DE | 10 2016 214 205 A1 | 2/2018 |
| EP | 2 052 876 A1 | 4/2009 |
| JP | 2013-536783 A | 9/2013 |
| JP | 2014-84014 A | 5/2014 |
| KR | 10-2017-0119359 A | 10/2017 |
| KR | 10-2018-0070123 A | 6/2018 |

* cited by examiner

TIRE NOISE REDUCTION DEVICE

CROSS-REFERENCE TO RELATED APPLICATION

The present application claims priority to Korean Patent Application No. 10-2018-0153853, filed on Dec. 3, 2018, the entire contents of which is incorporated herein for all purposes by this reference.

BACKGROUND OF THE INVENTION

Field of the Invention

The present invention relates to a tire noise reduction apparatus.

Description of Related Art

A pneumatic wheel and tire assembly, when inflated, is an acoustically resonant toroidal structure.

When a vehicle travels on a coarse rod surface such as concrete or asphalt including coarse stones, sound waves are generated inside a torus filled with air, causing resonance. The generated cavity resonance noise is propagated inside the tire by the air and is also transferred into the vehicle.

To reduce the tire resonance noise, a method of mounting a sound-absorbing material or a noise reduction apparatus in a tire, a method of deforming the shape of a wheel rim, or a method of attaching a material such as a sound-absorbing material or fur to the surface of a wheel is applied.

A conventional apparatus or structure for reducing tire resonance noise has a specific shape targeted at a specific frequency or is configured such that the shape is varied by a separate driving force applied thereto.

The frequency of noise generated inside the tire when the vehicle travels may vary depending on a driving state of the vehicle, surroundings of the tire, and the like. Accordingly, a tire noise reduction apparatus for effectively reducing noise inside a tire, the frequency of which is varied, is required.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a tire noise reduction apparatus configured for varying the resonance frequency thereof without providing a separate driving force during travel of a vehicle.

Furthermore, various aspects of the present invention provide a tire noise reduction apparatus configured for causing the resonance frequency thereof to vary while following the frequency of tire noise, and increasing noise reduction effects.

The technical problems to be solved by the present inventive concept are not limited to the aforementioned problems, and any other technical problems not mentioned herein will be clearly understood from the following description by those skilled in the art to which the present invention pertains.

According to various aspects of the present invention, a tire noise reduction apparatus may include a housing mounted on an external circumferential surface of a wheel rim on which a tire is mounted, the housing having an internal space and being open at one side in a circumferential direction of the wheel rim, wherein the housing may include a neck at an opposite side which is opposite to the open one side, and a movable member inserted into the internal space of the housing through the open one side of the housing and having an internal space in fluidical communication with the internal space of the housing, the movable member being mounted to the housing to be movable in a direction in which the movable member is inserted into the internal space of the housing and in a direction in which the movable member is withdrawn out of the housing.

The neck extends outside the housing from the opposite side of the housing which is opposite to the open one side, and may include a communicating hole through which the inside and the outside of the housing communicate.

The movable member is moved relative to the housing by a force generated by a rotation of the wheel rim, and a resonance frequency varies with a change in volumes of the internal spaces formed by the housing and the movable member.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

Terms, such as "first", "second", "A", "B", "(a)", "(b)", and the like, may be used herein to describe components of the present invention. Such terms are only used to distinguish one component from another component, and the substance, sequence, order, or number of these components is not limited by these terms. If a component were described as "connected", "coupled", or "linked" to another component, they may mean the components are not only directly "connected", "coupled", or "linked" but also are indirectly "connected", "coupled", or "linked" via a third component.

Figure 1:
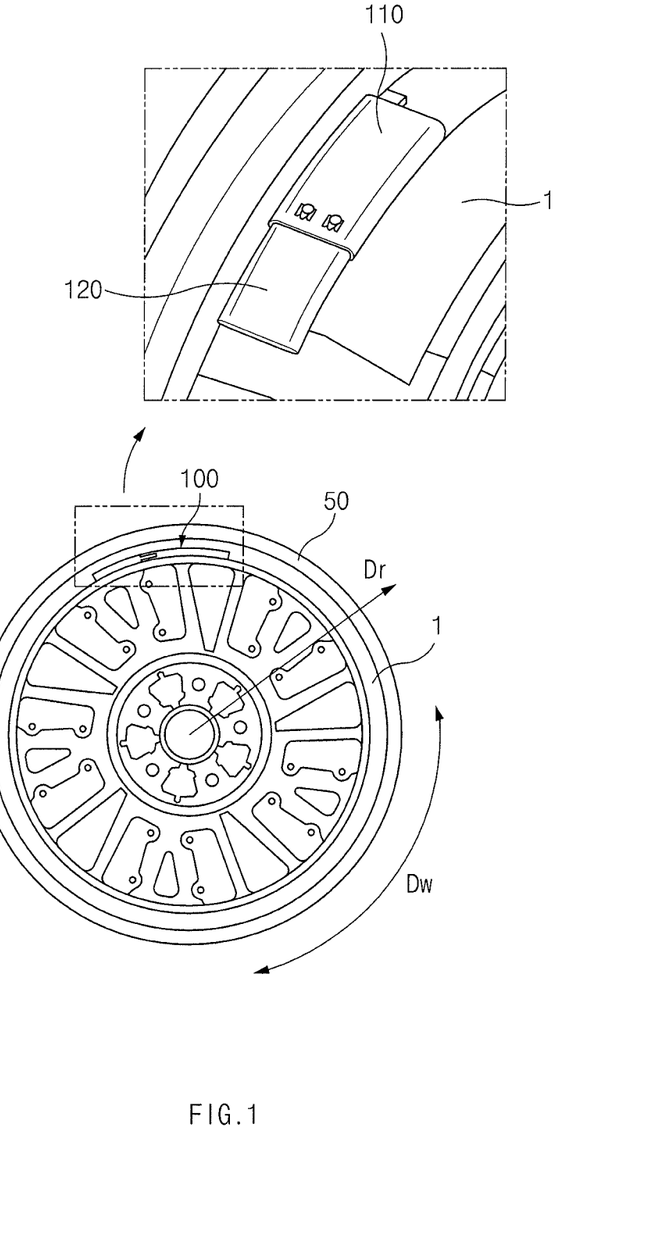
FIG. 1 is a view exemplarily illustrating a state in which a tire noise reduction apparatus according to an exemplary embodiment of the present invention is mounted on an external circumferential surface of a wheel rim.
Figure 2:
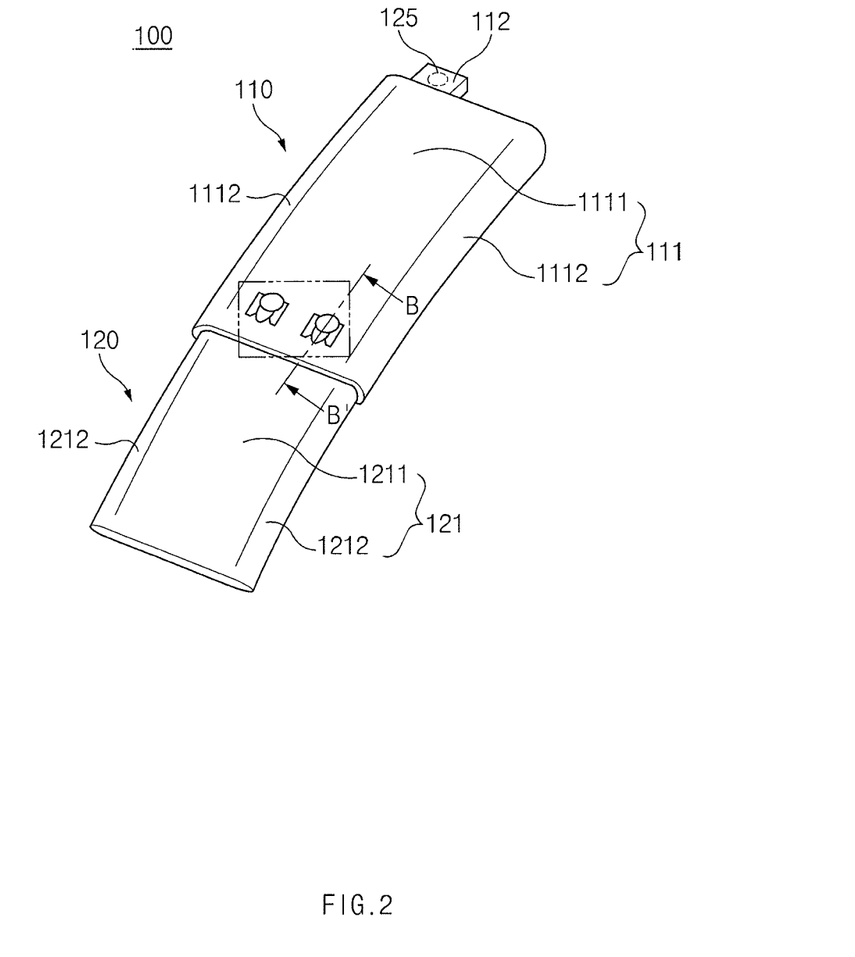
FIG. 2 is a perspective view exemplarily illustrating the tire noise reduction apparatus according to the exemplary embodiment of the present invention.
Figure 3:
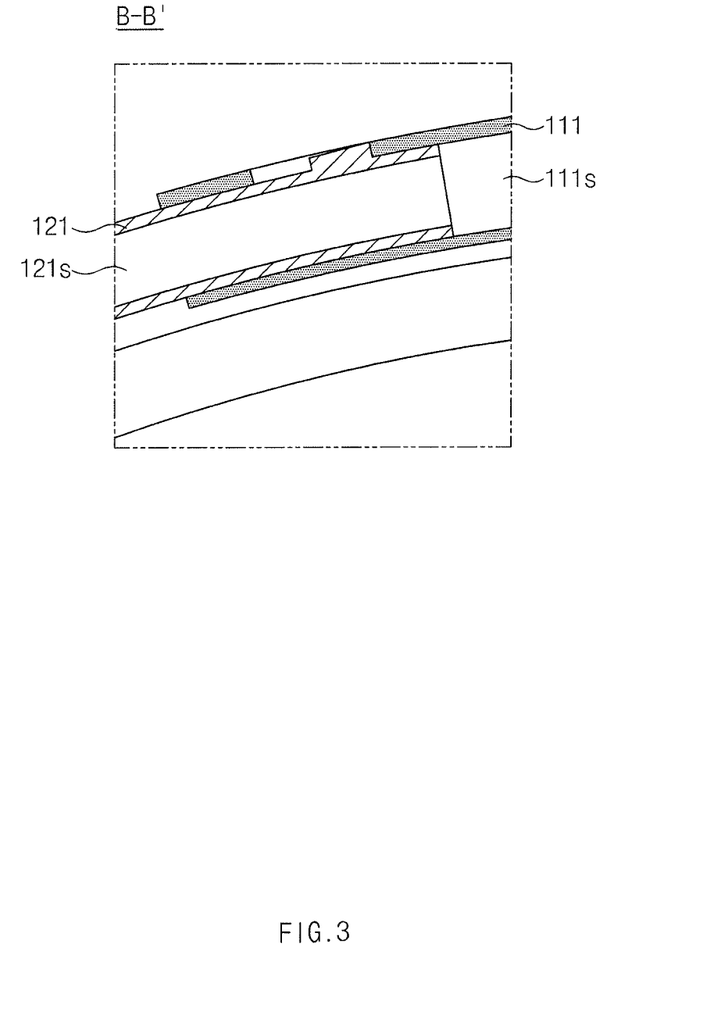
FIG. 3 is a sectional view taken along line B-B' of FIG. 2.

FIG. 1 is a view exemplarily illustrating a state in which a tire noise reduction apparatus 100 according to an exemplary embodiment of the present invention is mounted on an external circumferential surface of a wheel rim 1. FIG. 2 is a perspective view exemplarily illustrating the tire noise reduction apparatus 100 according to the exemplary embodiment of the present invention. FIG. 3 is a sectional view taken along line B-B' of FIG. 2.

The tire noise reduction apparatus 100 according to the exemplary embodiment of the present invention may include a housing 110 and a movable member 120.

The housing 110 includes a housing body 111 that forms the external appearance of the housing 110. The housing 110 is mounted on the external circumferential surface of the wheel rim 1 on which a tire is mounted, and has an internal space 111s. The housing 110 is open at one side in a circumferential direction Dw of the wheel rim 1. The housing 110 has a neck 112 at an opposite side which is opposite to the open one side thereof.

The neck 112 extends outside the housing 110 from the opposite side of the housing 110 which is opposite to the open one side thereof. The neck 112 includes a communicating hole through which the inside and the outside of the housing 110 communicate.

The movable member 120 is inserted into the internal space 111s of the housing 110 through the open one side of the housing 110 and has an internal space 121s in fluidical communication with the internal space 111s of the housing 110. The movable member 120 is mounted to the housing 110 to be movable in a direction in which the movable member 120 is inserted into the internal space 111s of the housing 110 and in a direction in which the movable member 120 is withdrawn out of the housing 110.

The above-configured tire noise reduction apparatus 100 according to the exemplary embodiment of the present invention has a feature wherein the movable member 120 is moved relative to the housing 110 by a force generated by a rotation of the wheel rim 1 and the resonance frequency varies with a change in the volumes of the internal spaces 111s and 121s formed by the housing 110 and the movable member 120.

The frequency of noise generated inside the tire is inversely proportional to the volume of the cavity inside the tire and is proportional to the propagation velocity of air inside the tire, as in Equation 1 below.

$$\text{Frequency of Noise } (f) \propto \frac{\text{Propagation Velocity } (c) \text{ of Air}}{\text{Volume } (V) \text{ of Cavity}} \quad \text{Equation 1}$$

The propagation velocity c of the air is greatly affected by the temperature of the air. For example, when the temperature inside the tire rises as the vehicle travels, the temperature of the air inside the tire may rise, and therefore the propagation velocity c of the air may increase, which may lead to a rise in the frequency f of the noise.

The volume V of the cavity inside the tire may vary depending in a state of the tire or a driving state of the vehicle. For example, the volume V of the cavity may be larger when the air pressure inside the tire is high than when the air pressure inside the tire is low. For example, the volume V of the cavity may increase when the temperature inside the tire is high.

In the case where the tire is filled with another gas rather than the air, the propagation velocity of the corresponding gas may be substituted into Equation 1, instead of the propagation velocity c of the air. For example, the tire may be filled with nitrogen gas rather than the air.

As described above, the frequency f of the noise generated inside the tire may vary depending on the external condition, the driving state of the vehicle, and the type of gas filling the tire. However, a tire noise reduction apparatus in the related art may target only resonance noise of a specific frequency since the tire noise reduction apparatus has a fixed shape. Therefore, the tire noise reduction apparatus in the related art may have a noise reduction effect when the noise of the specific frequency is generated, but the noise reduction performance may be degraded when noise of a different frequency is generated.

Since the tire noise reduction apparatus 100 according to the exemplary embodiment of the present invention has a feature wherein the frequency of the noise generated inside the tire varies as the vehicle travels, the resonance frequency may be varied to follow the varying noise frequency. The tire noise reduction apparatus 100 according to the exemplary embodiment of the present invention has a basic feature wherein to vary the resonance frequency, the movable member 120 is moved relative to the housing 110 by a force generated by a rotation of the wheel rim 1 and the volumes of the internal spaces 111s and 121s formed by the housing 110 and the movable member 120 are changed.

Prior to detailed description of the feature of the tire noise reduction apparatus 100 according to the exemplary embodiment of the present invention, the principle of a resonator related to the tire noise reduction apparatus 100 will be described in brief.

In general, the resonance frequency of the resonator is associated with the volume of the resonator, the cross-sectional area of a neck, and the length of the neck. The resonance frequency of the resonator may be provided by Equation 2 below.

$$w_0 = c\sqrt{\frac{S}{L_{\it eff} \cdot V}} \quad \text{Equation 2}$$

Here, $w_0$ is the resonance frequency (Hz) of the resonator, c is the propagation velocity (m/s) of air, S is the cross-sectional area (m$^2$) of the neck, $L_{\it eff}$ is the length (m) of the neck, and V is the volume (m$^3$) of the tire noise reduction apparatus.

Therefore, it may be seen that the resonance frequency of the resonator is varied by modifying at least one of the volume of the resonator, the cross-sectional area of the neck, and the length of the neck.

The tire noise reduction apparatus 100 according to an exemplary embodiment of the present invention may vary the resonance frequency by modifying the volume of the resonator among them.

Hereinafter, the feature of the tire noise reduction apparatus 100 according to the exemplary embodiment of the present invention will be described in detail.

Referring to FIG. 2 and FIG. 3, the housing 110 may have a substantially rectangular parallelepiped shape and may have an empty space inside. The housing 110 may have the internal space 111s therein.

The housing 110 may be open in an opposite direction to the direction in which the wheel rim 1 rotates when the vehicle provided with the wheel rim 1 travels forward thereof.

The housing 110 may have the neck 112 formed at the opposite side thereof which is opposite to the open one side thereof. The neck 112 may be integrated with the housing 110. Alternatively, the neck 112 may be implemented as separate from the housing 110 and may be combined with the housing 110.

The neck 112 may have a tube shape that extends outwardly from the opposite side of the housing 110. The neck 112 may have the communicating hole 125 formed therein, through which the internal space 111s of the housing 110 and the internal space of the tire 50 communicate. Accordingly, waves of noise generated inside the tire 50 may travel into the internal space of the tire noise reduction apparatus 100 through the neck 112, or waves inside the tire noise reduction apparatus 100 may travel into the internal space of the tire through the neck 112.

Among surfaces of the housing 110, an external surface portion 1111 of the housing 110 that includes a surface at the outside in a radial direction Dr of the wheel rim 1 may be curvedly connected to opposite side surface portions 1112 of the housing 110. The external surface portion 1111 of the housing 110 may be defined as an external surface portion of the housing body 111, and the opposite side surface portions 1112 of the housing 110 may be defined as opposite side surface portions of the housing body 111.

The housing 110 may have a shape with a curvature corresponding to the shape of the external circumferential surface of the wheel rim 1. The housing 110 is fixedly attached to the external circumferential surface of the wheel rim 1. To increase the coupling force with the wheel rim 1, the housing 110 may have a curvature corresponding to that of the external circumferential surface of the wheel rim 1. Since the housing 110 has a curvature corresponding to the curvature of the external circumferential surface of the wheel rim 1, the movable member 120, when the wheel rim 1 rotates, may be more effectively moved by a force generated by the rotation of the wheel rim 1.

The movable member 120 may have a substantially rectangular parallelepiped shape and may have an empty space inside. The movable member 120 includes a movable member body 121 that forms the external appearance of the movable member 120. The movable member 120 may be open at one side in the direction in which the movable member 120 is inserted into the internal space 111s of the housing 110. The movable member 120 may have a shape with an external surface portion corresponding to internal surfaces of the housing 110 to be inserted into the housing 110.

Among surfaces of the movable member 120, an external surface portion 1211 of the movable member 120 that includes a surface at the outside in the radial direction Dr of the wheel rim 1 may be curvedly connected to opposite side surface portions 1212 of the movable member 120. The external surface portion 1211 of the movable member 120 may be defined as an external surface portion of the movable member body 121, and the opposite side surface portions 1212 of the movable member 120 may be defined as opposite side surface portions of the movable member body 121.

When the wheel rim 1 rotates, the movable member 120 may be subjected to a centrifugal force, and the external surface portion 1211 of the movable member 120 may be supported by the external surface portion 1111 of the housing 110 in a radially inward direction thereof At the instant time, the rounded portions of the housing 110 and the movable member 120 may be in contact with each other, and therefore stress may be distributed to the rounded portions in contact with each other without being concentrated on any one portion when the movable member 120 is supported by the housing 110. Accordingly, a frictional force between the housing 110 and the movable member 120 may be reduced, and the movable member 120 may be easily moved in the circumferential direction Dw of the wheel rim 1.

According to the above-configured tire noise reduction apparatus 100 including the housing 110 and the movable member 120, when the wheel rim 1 rotates, the housing 110 may be fixed to the wheel rim 1 and may rotate at the same angular speed as the wheel rim 1, whereas the movable member 120, which is not fixed to the wheel rim 1, may rotate at a different angular speed than the wheel rim 1.

Accordingly, the movable member 120 moves in the direction in which the movable member 120 is withdrawn out of the housing 110, and the volumes of the internal spaces 111s and 121s formed by the housing 110 and the movable member 120 increase, lowering the resonance frequency.

The tire noise reduction apparatus 100 according to the exemplary embodiment of the present invention may further include an elastic structure for elastically supporting the movable member 120 in the direction in which the movable member 120 is inserted into the internal space 111s of the housing 110.

Accordingly, a force causing the movable member 120 to be withdrawn out of the housing 110 may be provided by a rotation of the wheel rim 1, and a force causing the movable member 120 to be inserted into the internal space 111s of the housing 110 may be provided by the elastic structure.

As the force generated by the rotation of the wheel rim 1 overcomes the elastic force generated by the elastic structure, the movable member 120 may be moved in the direction in which the movable member 120 is withdrawn out of the housing 110.

The elastic structure may include a protrusion formed on any one of the housing 110 and the movable member 120 and an accommodating portion formed in the other to accommodate the protrusion. The accommodating portion may generate an elastic force while being deformed when the movable member 120 is moved in the direction in which the movable member 120 is withdrawn from the housing 110.

Although it will be exemplified that the protrusion is formed on the movable member 120 and the accommodating portion is formed in the housing 110, it is apparent that the protrusion may be formed on the housing 110 and the accommodating portion may be formed in the movable member 120, and even in the instant case, the following description may be applied.

Figure 4A:
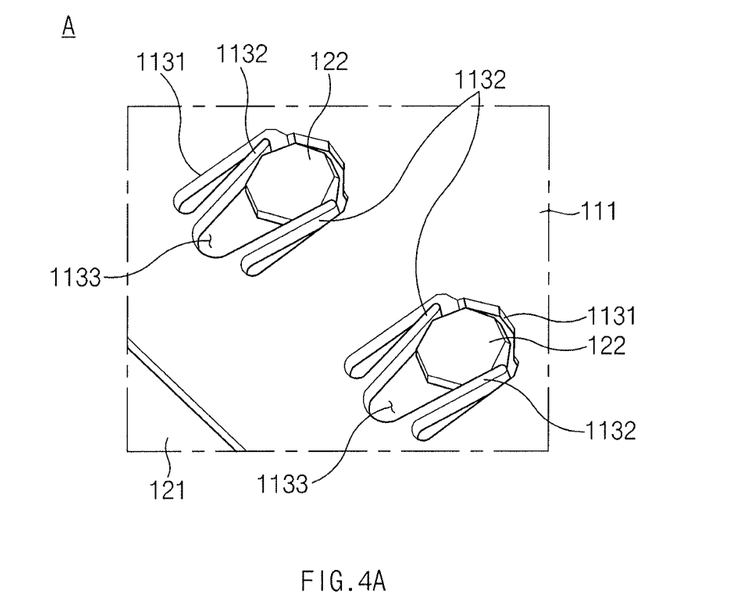
FIG. 4A and FIG. 4B are blowups of detail an in FIG. 2.
Figure 4B:
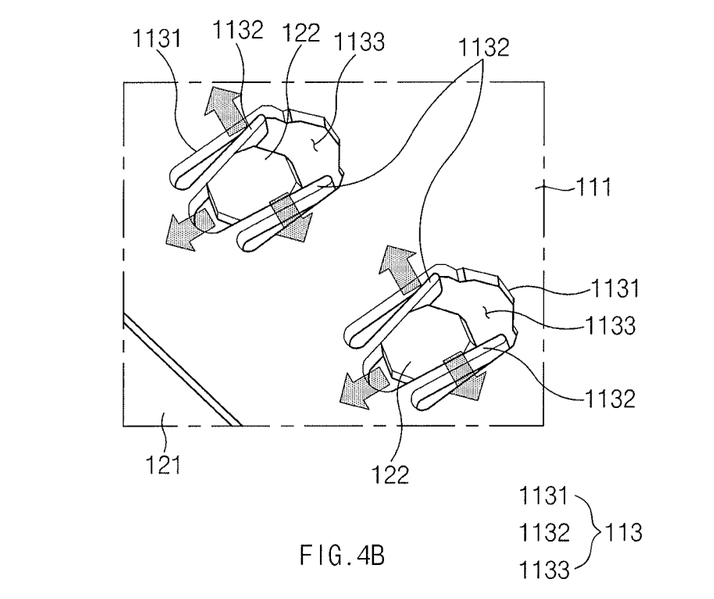

FIG. 4A and FIG. 4B are blowups of detail A in FIG. 2.

Referring to FIG. 4A and FIG. 4B, the movable member 120 may include protrusions 122 protruding from the external surface portion 1211 of the movable member 120 toward the housing 110. The protrusions 122 may have any one shape among polygonal, circular, and oval shapes. In the exemplary embodiment of the present invention, it is exemplified that the protrusions 122 have a polygonal shape.

The housing 110 may include accommodating portions 113 that accommodate the protrusions 122 and have a structure for applying an elastic force to the protrusions 122. Each of the accommodating portions 113 may include an accommodating recess (or an accommodating hole) 1131 and a pair of cantilevers 1132 formed at one inside end portion of the accommodating recess 1131.

The accommodating recess 1131 may be formed to be larger in size than the protrusion 122 to provide an insertion recess 1133 into which the protrusion 122 is inserted and a space in which the cantilevers 1132 are movable.

When the protrusion 122 is located in a first position, one side surface of the accommodating recess 1131 may be in contact with the protrusion 122. The first position may be defined as a position where the movable member 120 is inserted into the internal space 111s of the housing 110 to the maximum. Alternatively, the first position may be defined as the position of the protrusion 122 when the wheel rim 1 is at rest.

The one side surface of the accommodating recess 1131 may be formed in a shape angulated a plurality of times to correspond to the shape of the protrusion 122.

The insertion recess 1133 into which the protrusion 122 is inserted may be formed in the accommodating portion 113 along the circumferential direction Dw of the wheel rim 1, and therefore the protrusion 122 may be allowed to move relative to the accommodating portion 113. That is, the protrusion 122 inserted into the insertion recess 1133 may move in the circumferential direction Dw of the wheel rim 1, and therefore the movable member 120 may be movable relative to the housing 110.

The insertion recess 1133 into which the protrusion 122 is inserted may be defined by the pair of cantilevers 1132. The insertion recess 1133 may be defined by the pair of cantilevers 1132 and a portion of the accommodating recess 1131.

The pair of cantilevers 1132 may extend in the circumferential direction Dw of the wheel rim 1 and may have gradually decreasing spacing therebetween from one side to an opposite side with respect to the circumferential direction Dw of the wheel rim 1.

Referring to FIG. 4A and FIG. 4B, the pair of cantilevers 1132 may be connected to a side surface of the accommodating recess 1131 which is adjacent to an open end portion of the housing 110. When end portions of the pair of cantilevers 1132 that are connected to the accommodating recess 1131 are defined as connecting end portions and end portions on the opposite side to the connecting end portions are defined as free end portions, the pair of cantilevers 1132 may have gradually decreasing spacing therebetween from the free end portions to the connecting end portions.

Referring to FIG. 4B, as the protrusion 122 moves from a wide section to a narrow section between the pair of cantilevers 1132, the pair of cantilevers 1132 may elastically deform to move away from each other. Accordingly, an elastic force is accumulated in the pair of cantilevers 1132.

Furthermore, as the protrusion 122 moves toward the connecting end portions from the free end portions of the pair of cantilevers 1132, the magnitude of the elastic force generated by the pair of cantilevers 1132 may be increased.

When the force exerted on the movable member 120 by the rotation of the wheel rim 1 is decreased due to a reduction in the rotating speed of the wheel rim 1, the movable member 120 is moved by the elastic force in the direction in which the movable member 120 is inserted into the housing 110.

Figure 5:
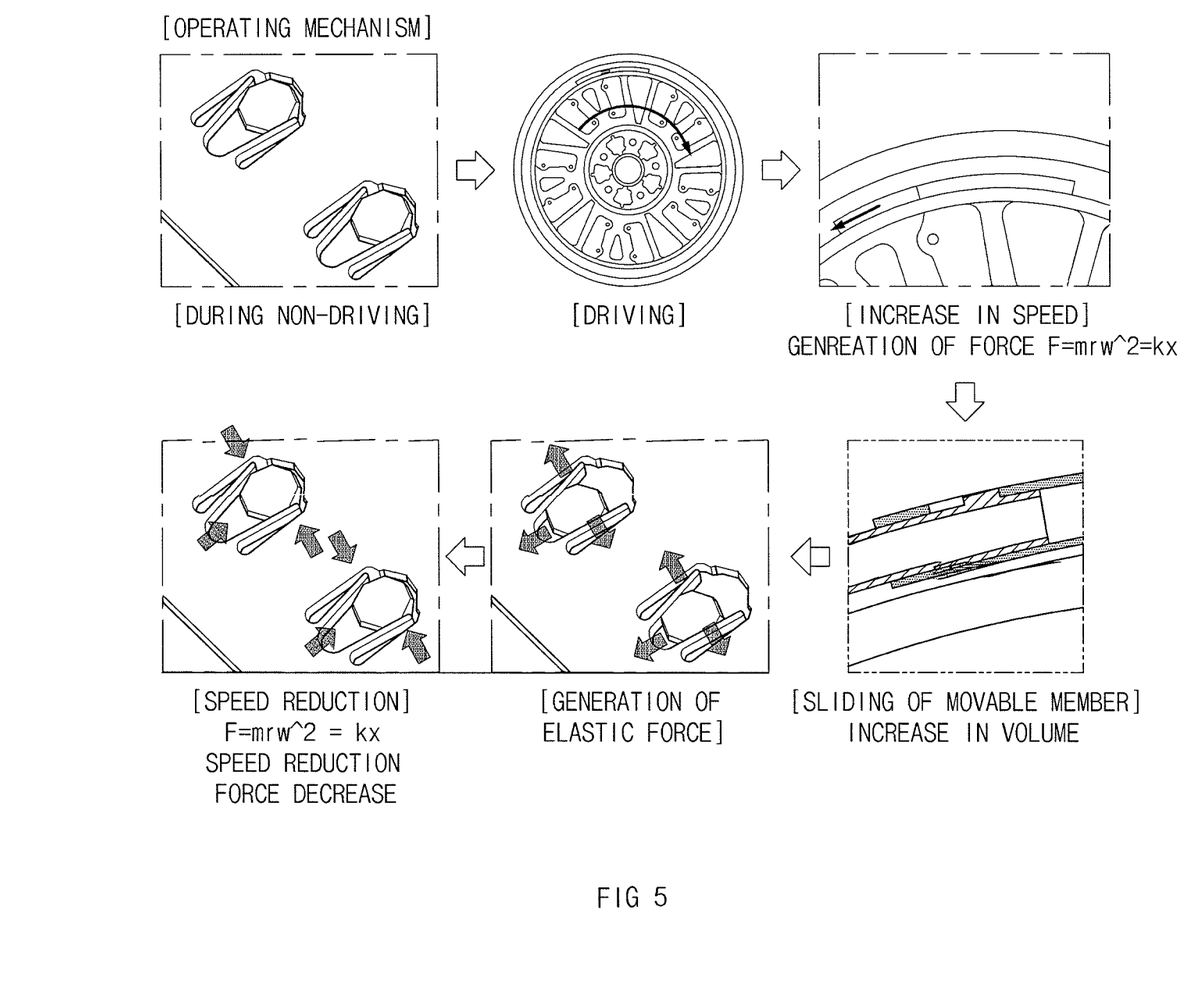
FIG. 5 is a view exemplarily illustrating an operation of the tire noise reduction apparatus according to the exemplary embodiment of the present invention.
Figure 6:
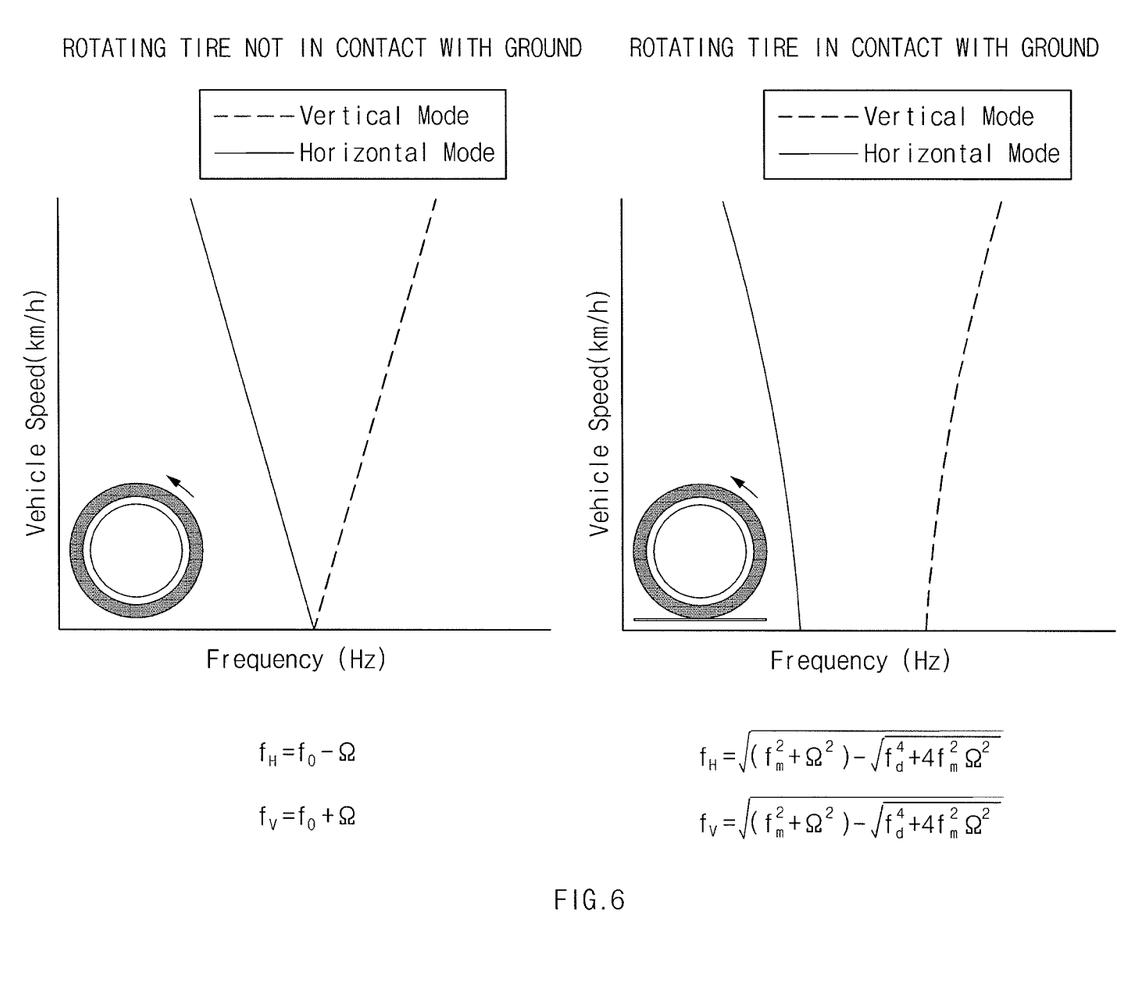
FIG. 6 is a view for explaining effects of the tire noise reduction apparatus according to the exemplary embodiment of the present invention.

FIG. 5 is a view exemplarily illustrating an operation of the tire noise reduction apparatus according to the exemplary embodiment of the present invention. FIG. 6 is a view for explaining effects of the tire noise reduction apparatus according to the exemplary embodiment of the present invention.

An operating mechanism of the above-configured tire noise reduction apparatus 100 according to the exemplary embodiment of the present invention will be described below.

First, when the vehicle does not travel, that is, when the rotating speed of the wheel rim 1 is zero (0), the movable member 120 is inserted into the housing 110 to the maximum.

When the vehicle starts to travel in the instant state, the wheel rim 1 rotates in one direction thereof.

As the rotating speed of the wheel rim 1 increases, a force of $F=mrw^2$ is exerted on the movable member 120. Here, F is a force, m is the mass of the movable member 120, r is the distance from the rotation center of the wheel rim 1 to the movable member 120 (or the radius of rotation of the movable member 120), and w is the angular speed at which the movable member 120 rotates.

The movable member 120 is moved outside the housing 110 by the force generated by the rotation of the wheel rim 1, and the elastic structure generates an elastic force when the movable member 120 is moved. In the instant case, the force exerted on the movable member 120 may broadly include the force $F=mrw^2$ generated by the rotation of the wheel rim 1 and the force $F=kx$ generated by the elastic structure. Here, k is the modulus of elasticity of the accommodating portions 113 including the cantilevers 1132, and x is the distance the movable member 120 or the protrusions 122 move. Accordingly, the movable member 120 may be moved to a position where the two forces acting in the different directions are in equilibrium.

While the rotating speed of the wheel rim 1 increases, the force generated by the rotation of the wheel rim 1 may become greater than the force generated by the elastic structure, and therefore the movable member 120 may be moved in the direction in which the movable member 120 is withdrawn out of the housing 110.

Meanwhile, while the rotating speed of the wheel rim 1 decreases, the force generated by the elastic structure may become greater than the force generated by the rotation of the wheel rim 1, and therefore the movable member 120 may be moved in the direction in which the movable member 120 is inserted into the internal space 111s of the housing 110.

The graph on the left side of FIG. 6 is a graph depicting frequencies of sound waves or noise generated inside a tire not in contact with the ground. The graph on the right side of FIG. 6 is a graph depicting frequencies of sound waves or noise generated inside the tire in contact with the ground.

Referring to the graph on the left side of FIG. 6, two different types of sound waves are generated inside the tire when the tire rotates. The tire is expanded or contracted by a centrifugal force or an air flow inside the tire when the tire rotates. Accordingly, two types of sound waves, vertical mode and horizontal mode, are generated inside the tire. Since there are various related art documents relevant thereto, a specific description thereof will be omitted herein.

Referring to the graph on the right side of FIG. 6, when the tire in contact with the ground rotates, the portion of the tire which is in contact with the ground is subjected to a larger deformation. Furthermore, it takes time for the deformed tire to be restored even though the tire is separated from the ground. Due to the deformation of the tire, two types of sound waves, vertical mode and horizontal mode, are generated in the rotating tire in contact with the ground in a fashion which is similar to but different from the fashion in which the two different types of sound waves are generated inside the rotating tire not in contact with the ground, as in the graph on the left side of FIG. 6.

The above-described tire noise reduction apparatus 100 according to the exemplary embodiment of the present invention has an increasing internal space with an increase in the rotating speed of the wheel rim 1. As the internal space of the tire noise reduction apparatus 100 increases, the resonance frequency is lowered as described above with reference to Equation 2. That is, the resonance frequency of the tire noise reduction apparatus 100 according to the exemplary embodiment of the present invention may vary in a fashion similar to the tendency of noise corresponding to the horizontal mode represented in FIG. 6. Accordingly, the tire noise reduction apparatus 100 according to the exemplary embodiment of the present invention may effectively remove noise corresponding to the horizontal mode.

A tire noise reduction apparatus according to various exemplary embodiments of the present invention may be configured to cause the resonance frequency of the tire noise reduction apparatus to follow the frequency of noise corresponding to the vertical mode represented in FIG. 6.

For example, a movable member may be mounted in an opposite direction to that in the exemplary embodiment of the present invention.

That is, in the other embodiment of the present invention, a housing may be open in the direction in which the wheel rim 1 rotates when the vehicle provided with the wheel rim 1 travels forward, and the movable member may be inserted into the housing through the open one side to be movable.

When the wheel rim 1 rotates, the movable member is moved by a force generated by the rotation of the wheel rim 1 in the direction in which the movable member is inserted into the internal space of the housing. Accordingly, the volumes of the internal spaces of the tire noise reduction apparatus formed by the housing and the movable member are decreased, and the resonance frequency of the tire noise reduction apparatus is raised.

Meanwhile, in the exemplary embodiment of the present invention, the tire noise reduction apparatus 100 may include an elastic structure for elastically supporting the movable member 120 in the direction in which the movable member 120 is withdrawn out of the housing 110. In the instant case, the movable member 120 may be inserted into the internal space of the housing 110 when the force generated by the rotation of the wheel rim 1 overcomes the elastic force generated by the elastic structure.

The tire noise reduction apparatus configured such that the resonance frequency is raised with an increase in the rotating speed of the wheel rim 1 or the travel speed of the vehicle merely corresponds to a modified example of the tire noise reduction apparatus 100 according to various aspects of the present invention, the exemplary embodiment of the present invention, which has been described above with reference to FIG. 1, FIG. 2, FIG. 3, FIG. 4, and FIG. 5. Therefore, those skilled in the art may modify portion of the structure of the tire noise reduction apparatus 100 according to various aspects of the present invention, the exemplary embodiment of the present invention, which has been described above with reference to FIG. 1, FIG. 2, FIG. 3, FIG. 4, and FIG. 5, to provide the tire noise reduction apparatus configured such that the resonance frequency is raised with an increase in the rotating speed of the wheel rim 1 or the travel speed of the vehicle.

According to the exemplary embodiments of the present invention, at least the following effects are achieved.

The movable member of the tire noise reduction apparatus may be moved relative to the housing by the force generated by the rotation of the wheel rim, and the resonance frequency may vary with the change in the volumes of the internal spaces formed by the housing and the movable member.

Furthermore, the resonance frequency of the tire noise reduction apparatus may increase or decrease depending on the speed of the vehicle or the rotating speed of the wheel rim and may follow the frequency of tire noise that varies depending on the vehicle speed, increasing tire noise reduction effects.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A tire noise reduction apparatus comprising:
    a housing mounted on an external circumferential surface of a wheel rim on which a tire is mounted, wherein the housing includes a first internal space and is open at a first side of the housing in a circumferential direction of the wheel rim, and wherein the housing includes a neck at a second side which is opposite to the open first side; and
    a movable member slidably inserted into the first internal space of the housing through the open first side of the housing and having a second internal space in fluidical communication with the first internal space of the housing, wherein the movable member being slidably mounted in the housing is selectively movable in a first direction in which the movable member is inserted into the first internal space of the housing or in a second direction in which the movable member is withdrawn out of the housing,
    wherein the neck is formed to extend outside the housing from the second side of the housing which is opposite to the first side, and includes a communicating hole through which the first internal space of the housing fluidically communicates with the inside of the tire, and wherein the movable member is selectively movable relative to the housing in the first direction or the second direction according to a force generated by a rotation of the wheel rim, and a resonance frequency of the tire noise reduction apparatus varies with a change in volumes of the first internal space of the housing and the second internal space of the movable member.

2. The tire noise reduction apparatus of claim 1,
wherein the housing is open in the second direction opposite to a direction in which the wheel rim rotates when a vehicle provided with the wheel rim travels forward of the vehicle, and
wherein while the wheel rim rotates when the vehicle provided with the wheel rim travels forward of the vehicle, the movable member is moved in the second direction in which the movable member is withdrawn out of the housing, and the resonance frequency is lowered with an increase in the volumes of the first internal space of the housing and the second internal space of the movable member.

3. The tire noise reduction apparatus of claim 2, further including:
an elastic structure elastically supporting the movable member in the first direction in which the movable member is inserted into the first internal space of the housing,
wherein the movable member is moved in the second direction in which the movable member is withdrawn from the housing when the force generated by the rotation of the wheel rim overcomes an elastic force generated by the elastic structure.

4. The tire noise reduction apparatus of claim 3,
wherein the elastic structure includes a protrusion formed on one of the housing and the movable member and an accommodating portion formed in another, the protrusion being inserted into the accommodating portion, and
wherein the accommodating portion is configured to generate the elastic force while being deformed by the protrusion when the movable member is moved in the second direction in which the movable member is withdrawn from the housing.

5. The tire noise reduction apparatus of claim 4,
wherein the accommodating portion has an insertion recess that extends in the circumferential direction of the wheel rim and into which the protrusion is slidably inserted so as to allow the protrusion to move relative to the accommodating portion, and
wherein a width of the insertion recess is decreased from a one side to an opposite side of the insertion recess with respect to the circumferential direction of the wheel rim, and the elastic force exerted on the protrusion is increased as the protrusion moves from the one side to the opposite side of the insertion recess.

6. The tire noise reduction apparatus of claim 4,
wherein the accommodating portion includes an accommodating recess and a pair of cantilevers formed at an internal end portion of the accommodating recess,
wherein the pair of cantilevers extend in the circumferential direction of the wheel rim and have an insertion recess therebetween, into which the protrusion is slidably inserted, and spacing between the pair of cantilevers is decreased along the second direction from a one side to an opposite side of the insertion recess with respect to the circumferential direction of the wheel rim, and
wherein the elastic force exerted on the protrusion is increased as the protrusion moves from a wide section to a narrow section formed between the pair of cantilevers along the second direction.

7. The tire noise reduction apparatus of claim 1, wherein the housing and the movable member respectively include an external surface portion located at an external side in a radial direction of the wheel rim and opposite side surfaces curvedly connected to the external surface portion.

8. The tire noise reduction apparatus of claim 7, wherein the housing and the movable member have a curvature corresponding to a curvature of the external circumferential surface of the wheel rim.

9. A tire noise reduction apparatus comprising:
a housing mounted on an external circumferential surface of a wheel rim on which a tire is mounted, wherein the housing includes a first internal space and is open at a first side of the housing in a circumferential direction of the wheel rim, and
a movable member slidably inserted into the first internal space of the housing through the open first side of the housing and having a second internal space in fluidical communication with the first internal space of the housing, wherein the movable member being slidably mounted in the housing is selectively movable in a second direction in which the movable member is inserted into the first internal space of the housing or in a first direction in which the movable member is withdrawn out of the housing,
wherein the movable member is selectively movable relative to the housing in the first direction or the second direction according to a force generated by a rotation of the wheel rim, and a resonance frequency of the tire noise reduction apparatus varies with a change in volumes of the first internal space of the housing and the second internal space of the movable member, and
wherein the housing is open in the first direction in which the wheel rim rotates when a vehicle provided with the wheel rim travels forward, and wherein while the wheel rim rotates when the vehicle provided with the wheel rim travels forward, the movable member is moved in the second direction in which the movable member is inserted into the first internal space of the housing, and the resonance frequency is raised with a decrease in the volumes of the first internal space of the housing and the second internal space of the movable member.

10. The tire noise reduction apparatus of claim 9, further including:
an elastic structure configured to elastically support the movable member in the first direction in which the movable member is withdrawn out of the housing,
wherein the movable member is moved in the second direction in which the movable member is inserted into the first internal space of the housing, when the force generated by the rotation of the wheel rim overcomes an elastic force generated by the elastic structure.

* * * * *